No. 850,574. PATENTED APR. 16, 1907.
M. L. HARRIS.
CLOD FENDER.
APPLICATION FILED FEB. 1, 1906.

Witnesses
Frank R. Slow
H. C. Rodgers

Inventor
Myron L. Harris
By George W. Thorpe
Atty.

UNITED STATES PATENT OFFICE.

MYRON L. HARRIS, OF BAZAAR, KANSAS.

CLOD-FENDER.

No. 850,574. Specification of Letters Patent. Patented April 16, 1907.

Application filed February 1, 1906. Serial No. 298,906.

*To all whom it may concern:*

Be it known that I, MYRON L. HARRIS, a citizen of the United States, residing at Bazaar, in the county of Chase and State of Kansas, have invented certain new and useful Improvements in Clod-Fenders, of which the following is a specification.

My invention relates to clod-fenders of that class employed with cultivators of listed plants, and more especially to skeleton fenders through which fine earth may pass for the purpose of covering the young grass and weeds over which the fender travels in the cultivating operation; and my object is to produce a fender of this character in which the openings may be made of variable size.

With this and other objects in view, as hereinafter appear, the invention consists in certain novel and peculiar features of construction and organization, as hereinafter described and claimed, and in order that it may be fully understood reference is to be had to the accompanying drawings, in which—

Figure 1:
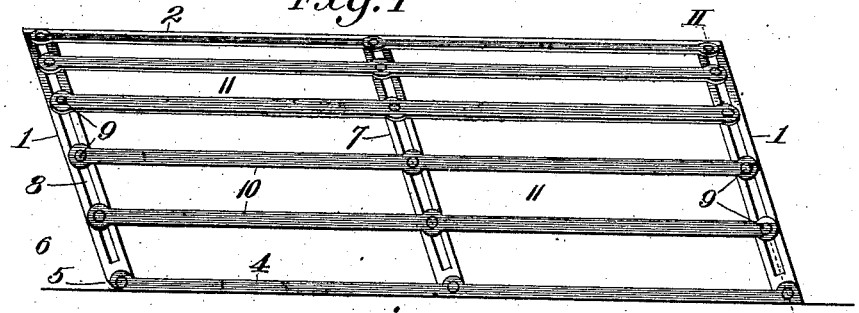
Figure 2:
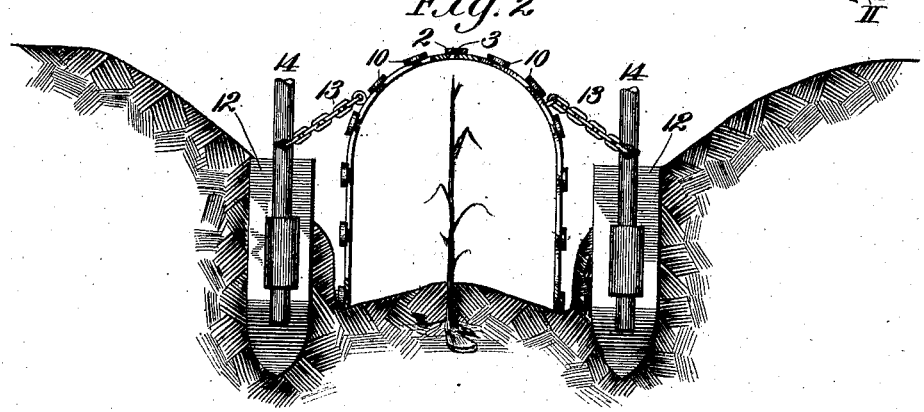
Figure 3:
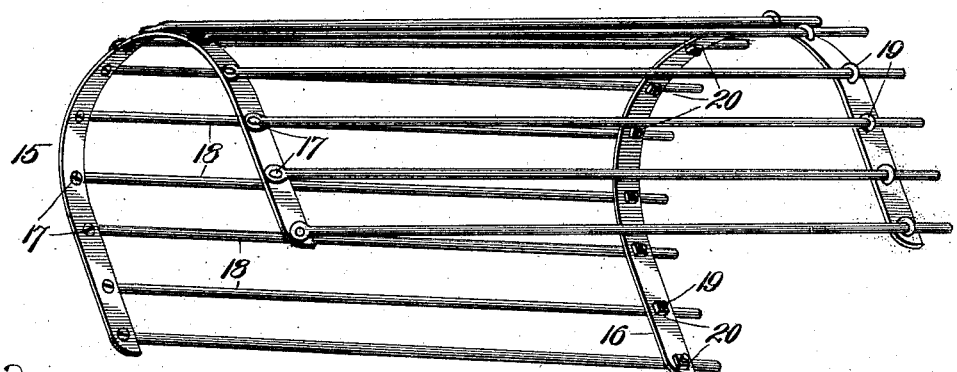

Figure 1 is a side elevation of a fender embodying my invention. Fig. 2 is a vertical section of the same on the line II II of Fig. 1. Fig. 3 is a perspective view of a modified form of fender.

In the said drawings, 1 indicates a pair of arches which, by preference, are pitched forwardly, and said arches are connected centrally by a longitudinal bar 2 through the medium of bolts 3 and are connected at their lower ends by longitudinal bars 4, having their front ends rounded, as at 5, so as to ride more readily over obstructions in the path of the fender, the lower ends of the front arch being likewise rounded, as at 6, for the same purpose. To stiffen the fender, I also employ, by preference, a third arch 7, disposed centrally between arches 1 and to which said bars 2 and 4 are also secured.

8 indicates slots in the arches, which extend from points contiguous to the central bar 2 nearly to the lower ends of the arches, and extending up through said slots are bolts 9, the outer ends of the bolts engaging and clamping against the outer sides of the archer longitudinal bars 10, so as to provide a series of substantially parallel openings 11 between said bars and the central bar 2 and the bottom bars 4, which openings can be varied in width by adjustment of bolts 9 in the slots 8.

In practice the bars 10 will be so spaced that the width of the openings or spaces 11 will increase toward lower ends of the arches. By this arrangement it is obvious that of the earth turned by the shovels 12 or other cultivating devices upon the fender only the very fine particles can pass through the upper openings or spaces and fall upon the plants for the purpose of covering the young grass and weeds contiguous thereto, it being understood that the soil in such condition will not injure the plants in the least, because such spears of corn are comparatively strong and stiff. Such fine earth, however, will crush, and therefore impede, the growth of the grass and tender weeds which are inaccessible to the cultivating appliances. The larger clods of earth will fall upon and roll down at opposite sides of the fender, the smaller clods rolling inward through the larger openings or spaces of the fender without injury to the plants, but more effectually covering up the young grass and weeds referred to. The clods which are sufficiently heavy to injure the plants will be unable to pass through any of the openings or spaces and by the time the rear end of the fender passes them on its forward progress will have become arrested, and consequently will not roll down upon the plants after the fender passes. To give time for the heavy clods to get to a standstill, the fender will preferably be made of greater length than the ordinary fender.

The fender may be attached to the cultivator in any suitable manner (not shown) for the purpose of effecting its forward progress, and in order to guide the fender against any lateral movement which might endanger the plants I preferably connect the front or middle arch by flexible devices, such as the chains 13, to the frames or supports 14 of the cultivating devices, as shown in Fig. 2.

As an alternative or modified construction reference is herewith made to Fig. 3, which shows a front arch 15 and a rear arch 16 of greater width than the front arch, bolts 17 securing to the front arch the forward ends of bars 18, the rear ends of bars 18 extending through eyebolts 19 and through the rear arch, nuts 20 engaging said bolts for the purpose of clamping the rear arch at the desired point on bars 18. By this arrangement it is obvious that the fender is flared outwardly and rearwardly more or less according to the adjustment of the rear arch, the adjustment desired being determined by the nature and condition of the soil under cultivation. By this type of fender the heavier clods of earth are forced outwardly from the plants, so as to give an opportunity for the fine earth to fall in around the plants, and thus provide a bed to receive said clods which will arrest them in their tendency to roll down upon the plants.

From the above description it will be apparent that I have produced a clod-fender possessing the features of advantage enumerated as desirable and which obviously is susceptible of change in its form, proportion, detail, construction, and arrangement of parts without departing from the principle of construction involved.

Having thus described the invention, what I claim as new, and desire to secure by Letters Patent, is—

1. A clod-fender comprising a plurality of arches, and longitudinal bars connecting and bearing a movable relation to the same.

2. A clod-fender, comprising a plurality of arches, and longitudinal bars connecting said arches; certain of said bars being laterally adjustable.

3. A clod-fender, comprising a plurality of arches and longitudinal bars pivotally connecting the lower ends of the arches and forming runners for the same, and a series of longitudinal bars connecting the arches and adjustable toward or from each other.

4. A clod-fender, comprising a plurality of slotted arches, bars pivotally connecting the lower ends of said arches, longitudinal bars connecting said arches between the first-named bars, and clamping devices extending through the slots of the arches and engaging said longitudinal bars.

In testimony whereof I affix my signature in the presence of two witnesses.

MYRON L. HARRIS.

Witnesses:
  W. A. MORGAN,
  J. E. BOCOOK.